(12) United States Patent
Lee et al.

(10) Patent No.: US 6,291,405 B1
(45) Date of Patent: *Sep. 18, 2001

(54) GLYCOL BASED DRILLING FLUID

(75) Inventors: LiJien Lee; Arvind D. Patel; Emanuel Stamatakis, all of Houston, TX (US)

(73) Assignee: M-I LLC, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,225

(22) PCT Filed: Sep. 9, 1996

(86) PCT No.: PCT/US96/14404

§ 371 Date: Mar. 11, 1998

§ 102(e) Date: Mar. 11, 1998

(87) PCT Pub. No.: WO97/00313

PCT Pub. Date: Mar. 20, 1997

Related U.S. Application Data

(60) Provisional application No. 60/003,546, filed on Sep. 11, 1995.

(51) Int. Cl.$^7$ ............................. C09K 3/00; C09K 7/02
(52) U.S. Cl. ............................. 507/136; 507/261
(58) Field of Search .................. 507/139, 136, 507/261

(56) References Cited

U.S. PATENT DOCUMENTS

| | | | |
|---|---|---|---|
| H1611 | 11/1996 | Patel ........................... | 507/103 |
| 3,639,233 | * 2/1972 | Schultz et al. ............... | 507/136 |
| 3,953,337 | * 4/1976 | Walker et al. ............... | 507/136 |
| 4,614,235 | * 9/1986 | Keener et al. ............... | 166/301 |
| 4,747,969 | 5/1988 | Rupilius et al. .............. | 554/160 |
| 4,830,765 | 5/1989 | Perricone et al. ............ | 307/136 |
| 4,941,981 | 7/1990 | Perricone et al. ............ | 507/136 |
| 4,963,273 | 10/1990 | Perricone et al. ............ | 507/136 |
| 4,964,615 | 10/1990 | Mueller et al. .............. | 507/243 |
| 5,007,489 | * 4/1991 | Enright et al. ............... | 175/65 |
| 5,057,234 | 10/1991 | Bland et al. ................. | 507/128 |
| 5,072,794 | 12/1991 | Hale et al. .................. | 175/50 |
| 5,099,930 | * 3/1992 | Enright et al. ............... | 175/65 |
| 5,120,708 | 6/1992 | Melear ........................ | 507/126 |
| 5,502,030 | * 3/1996 | Patel ........................... | 507/126 |
| 5,586,608 | * 12/1996 | Clark et al. .................. | 175/40 |
| 5,635,458 | * 6/1997 | Lee et al. .................... | 507/240 |
| 5,990,050 | * 11/1999 | Patel ........................... | 507/136 |

FOREIGN PATENT DOCUMENTS

| | | | |
|---|---|---|---|
| 3249133 C2 | * 11/1983 | (DE) . | |
| 3842703 A1 | * 6/1990 | (DE) . | |
| 3842703A1 | 6/1990 | (DE) ............... | C09K/7/06 |
| 4201793 A1 | * 10/1992 | (DE) . | |
| 374671A1 | 6/1990 | (EP) ............... | C09K/7/06 |
| 449257A2 | 10/1991 | (EP) ............... | C09K/7/06 |
| 495579A3 | 7/1992 | (EP) ............... | C09K/7/02 |
| A 0 652 271 | 5/1995 | (EP) . | |
| 730018A1 | 9/1996 | (EP) ............... | C09K/7/02 |
| A 751191 | 6/1956 | (GB) . | |
| 2223255 | 4/1990 | (GB) ............... | C09K/7/06 |
| 2251447 | 7/1992 | (GB) ............... | C09K/7/06 |
| 2252993 | 8/1992 | (GB) ............... | C09K/7/06 |
| A 2283036 | 4/1995 | (GB) . | |
| WO89/01491 | 2/1989 | (WO) ............... | C07K/7/00 |
| WO90/06890 | 6/1990 | (WO) . | |
| WO90/06981 | 6/1990 | (WO) . | |
| WO93/16145 | 8/1993 | (WO) ............... | C09K/7/06 |
| WO93/23491 | 11/1993 | (WO) . | |
| WO94/16030 | 7/1994 | (WO) ............... | C09K/7/06 |
| A 96/19545 | 6/1996 | (WO) . | |
| WO96/19545 | 6/1996 | (WO) ............... | C09K/7/06 |

OTHER PUBLICATIONS

Dickey, Parke A.; Petroleum Development Geology, 2nd Ed.; Penn Well Books before 1988, pp. 57–83.
The Dow Chemical Company; Physical Properties of Dowanol Glycol Ethers and Acetates: table; Jun. 1995.
The Dow Chemical Company; Material Safety Data Sheet, Oct. 20,1997.
The Dow Chemical Company; Product Company; Material Information—Dowanol DPNB, Apr. 1997.
The Dow Chemical Company; The Glycol Eshters Handbook, Oct. 1993.
Chemical Abstract Services Search Repport, Oct. 27, 1997.
Aldrich Katalog Handbuch Feinchemikalien, Aldrich GmbH & Col. KG, Steinheim /DE 1994, p. 557.

\* cited by examiner

*Primary Examiner*—Jill Warden
*Assistant Examiner*—LaToya Cross
(74) *Attorney, Agent, or Firm*—Howrey Simon Arnold & White, LLP; Stephen H. Cagle; Carter J. White

(57) ABSTRACT

This invention relates to an improved glycol based aqueous drilling fluid. The drilling fluid of this invention has demonstrated utility in controlling and/or reducing swelling of clay formations in the drilling of subterranean wells.

10 Claims, No Drawings

GLYCOL BASED DRILLING FLUID

This is the U.S. National Phase of International Patent Application No.: PCT/US96/14404; filed Aug. 22, 1996 which claims priority of then U.S. Provisional Application No.: 60/003,546, filed Sep. 11, 1995 now abandoned.

This invention relates to a water miscible glycol base drilling fluid for application in drilling highly active shale formations. The high performance drilling fluid of this invention provides shale stabilization and swelling inhibition of active and swellable shale. In addition to shale stabilization and swelling inhibition of shale, the drilling fluid of this invention provides anti-bit balling and anti-sticking properties to the drilled cuttings during the drilling operation.

The glycol base drilling fluid of this invention has a continuous phase which is predominantly glycol and a particulate phase which consists of solids carried or suspended in the continuous phase. It may also contain immiscible liquids which are emulsified into the continuous phase during use. In the case of water-misible-glycol base drilling fluids, water incorporated into the drilling fluid becomes part of the continuous phase and is not emulsified into it.

During oil and gas drilling operations, long sections of argillaceous formations having clay minerals as major constituents, such as shales, mudstones, siltstones, and claystones, often have to be penetrated before reaching the hydrocarbon bearing zones. Various drilling problems, such as bit balling, swelling or sloughing of wellbore, stuck pipe, and dispersion of drilled cuttings, are frequently encountered while drilling such formations. This is especially true when using water-based drilling fluids and can result in tremendous losses of operation time and increases in operation costs. Because of their tendency to become unstable on contact with water, such argillaceous formations are also commonly referred to as water-sensitive shales.

The unstable tendency of water-sensitive shales can be related to water adsorption and hydration of clays. When a water-based mud comes in contact with shales, water adsorption occurs immediately. This causes clays to hydrate and swell resulting in stress and/or volume increases. Stress increases can induce brittle or tensile failure of the formations, leading to sloughing cave in, and stuck pipe. Volume increases, on the other hand, reduce the mechanical strength of shales and cause swelling of wellbore, disintegration of cuttings in drilling fluid, and balling up of drilling tools. The best way to minimize these drilling problems is to prevent water adsorption and clay hydration from occurring, and oil-based drilling fluids are believed to be the most effective for this purpose.

The inhibitive action of oil-based drilling fluids arises from the emulsification of brine in oil, which acts as a semi-permeable barrier that materially separates the water molecules from being in direct contact with the water-sensitive shales. Nevertheless, water molecules may flow through this semi-permeable barrier when the water activity of the oil-based drilling fluid differs from that of the shale formation. To prevent water molecules from being osmotically drawn into shale formations, the water activity of the oil-based drilling fluid is usually adjusted to a level equal to or less than that of the shales. Due to their detrimental impacts on environments, oil-based drilling fluids are subject to more stringent restrictions in their usage, and oftentimes water-based drilling fluids must be used instead. Thus, there is a need to improve the inhibitive properties of water-based drilling fluids so that water adsorption and hydration of clays can be controlled and/or minimized.

Treating, water-based drilling fluids with inorganic chemicals and polymer additives is a common technique used to reduce hydration of shales. For example, the use of potassium chloride to stabilize shale formations was disclosed in U.S. Pat. No. 1,460,788; and it is still widely used by the industry for this purpose. Chemicals containing other inorganic cations, such as sodium, calcium, ammonium, cesium, etc., also have been claimed to provide or improve shale stabilization when used alone or with polymer additives in water-based drilling fluids. Examples of such chemicals and methods of use are disclosed, for example., in U.S. Pat. Nos. 4,142,595 and 3,843,524. Discussions on the shale stabilizing mechanisms of inorganic cations and polymer additives can be found in the literature.

In addition to inorganic cations and polymer additives, water-soluble organic polar compounds also can be used to provide shale stabilization and swelling inhibition. For example, the use of polyhydroxy alcohols, such as glycerol, glycol, sorbitol and erytlhritol, for combating heaving shales is disclosed in U.S. Pat. No. 2,191,312; the use of mixtures consisting of polyvalent metal-guanidine complexes, cationic starches, and polyglycols for shale stabilization is disclosed in U.S. Pat. No. 4,719,02; and the use of water-soluble glycol compounds and their derivatives for shale swelling inhibition is disclosed in U.S. Pat. Nos. 4,963,273, 4,941,981, and 4,830,765.

High concentrations of glycols and similar compounds not only increase the drilling fluid cost, but also can cause severe problems with hydration of polymer additives, control of mud properties, and suspension of weighting agents, especially at high mud weights and high solids contents. This again can be related to the lack of water, which helps many mud additives to solubilize and function properly. Therefore, in order to reduce cost and particularly to minimize these undesirable side effects, the concentration of glycols and similar compounds has been minimized in prior art applications of glycols in drilling fluids. See for example UK Patent Publication GB 2251876 A, and European Patent Application 92300151.5, Publication no. 0 495 579 A3. The use of greater than 40% water in prior art glycol base drilling fluids have, however, limited their ability to inhibit the clay swelling and the problems of drilling associated with swelling of the clay. The instant invention is not so limited.

Accordingly, the glycol-based drilling fluid of this invention is contrary to the use of greater than 40% of water in the drilling fluid art. U.S. patents in the drilling fluid art that include at least reference to the inclusion of glycols in drilling fluids include: U.S. Pat. No. 2,191,312 (Cannon); U.S. Pat. No. 4,780,220 (Peterson); U.S. Pat. Nos. 4,830,765 (Perricone et al); 4,941,981 (Perricone et al); U.S. Pat. No. 4,963,273 (Perricone et al); U.S. Pat. No. 4,498,994 (Heilweil); U.S. Pat. No. 5,076,373 (Hale et al); and U.S. Pat. No. 5,083,622 (Hale et al); and U.S. Pat. No. 5,248,664 (Hale et al.). Also, UK patent application no. 9420934.3 (Wilson), PCT international application no. PCT/NO 88/00063 (Ardo) and PCT/WO 96/19545 (Van Slyke). Thus, it would be an advancement in the art to provide an improved glycol-based drilling fluid that can prevent water adsorption and shale hydration more effectively using high concentration of glycols, while eliminating the problems that can be expected at high concentrations of glycols.

Glycol-based drilling fluids have been developed in which the base fluid consists of water-soluble glycol(s) or a mixture of same with up to 30% fresh or saline water. These glycol-based drilling fluids exhibit better lubricity than water-based muds and lower environmental impact than oil-based muds.

It is preferred that the glycols in muds of this invention have a viscosity of less than 50 cP at 120 degrees F. in order to avoid excessively viscous muds. Also it is preferred that polymer additives for fluid loss control, for instance, be soluble in the glycol used in the mud. Salts, surfactants, polymers, or other additives can be added to the muds to achieve, where desired, special performance characteristics, e.g., to facilitate formation evaluation or to control heaving shales.

To combat the problems of sticking and bit balling of downhole tools associated with surface swelling an anti-sticking agent is added to the drilling fluid of this invention.

The density of glycol-based drilling fluids may be increased by adding conventional weighting agents such as barite, iron oxide, dolomite, calcium carbonate or soluble salts. Suspension of particulate weighting agents is preferably obtained using glycol-soluble gums, polymers or gels, or with rod-like clays such as attapulgite or sepiolite.

Better shale inhibition can be obtained by introducing salts to glycol fluids. The combination of salts and glycol improves inhibition through a simultaneous adsorption of the cations and glycols on shale surfaces. The salts used in the present invention include sodium chloride, potassium chloride, calcium chloride, magnesium chloride, sodium bromide, calcium bromide, potassium acetate, potassium formate, choline chloride and the like.

Accordingly, one embodiment of the present invention is a glycol-based drilling fluid that comprises: 1) a water-miscible glycol, with a molecular weight of less than about 200, such as ethylene glycol, diethylene glycol, triethylene glycol, propylene glycol, butylene glycol and mixtures thereof, at a concentration of at least 70% and preferably in a range from 70% to 100%, most preferably from 80% to 100%, and even more preferably from 85% to 100%, all as volume percent of the continuous phase of the drilling fluid; 2) water, not in excess of 30% by volume; 3) a salt or salts selected from the group consisting of sodium chloride, potassium chloride, magnesium chloride, calcium chloride, sodium bromide, calcium bromide, potassium acetate, potassium formate and choline chloride at a concentration greater than 50,000 mg/liter of water in the drilling fluid; 4) an anti-stickinig drilling fluid additive at a concentration of greater than 0.5% by weight of drilling fluid, 5) a filtration control agent for lowering fluid loss of the drilling fluid; and 6) a viscosifier for suspension of solids and weighting material in the drilling fluid. Various subcombinations of these components may also be used as a glycol-based drilling fluids.

The inhibitive effects and superior performance of the drilling fluid of this invention on water-sensitive shales have been evaluated by conducting swelling tests, dispersion tests, and anti-sticking tests that were conducted under simulated downhole conditions. The drilling fluids of this invention provide better swelling inhibition, cuttings stability, wellbore stabilization, and lower water adsorption compared with water-based glycol-containing drilling fluids formulated according to prior art.

An improved high performance inhibitive glycol base drilling fluid has been developed for drilling highly swellable shale. In the North Sea and the United States Gulf Coast areas, drillers commonly encounter argillaceous sediments commonly called "gumbo shale" in which the predominant montmorillonite clay mineral is notorious for its swelling and sticking problems. Thus, given the frequency in which gumbo shale is encountered in drilling, we have developed a high performance drilling fluid which is comprised of a glycol base with additives to combat the problems of sticky shale due to surface swelling. The drilling fluid has a predominantly glycol continuous phase and an anti-sticking drilling fluid additive.

The presence of water with water soluble glycol in the drilling fluid will cause some surface swelling of shale. The surface swelling will impart the sticking properties to the formation and drilled cuttings. Dissolved salts reduce swelling, but insufficiently for severe gumbo shales. To combat the problems of sticking, the high performance inhibitive drilling fluid of this invention further contains an anti-sticking agent. Materials found effective as anti-sticking agents in the glycol-base fluid of this invention include silicone fluids. silicone-based surfactants, glycol-ethers, carboxylic acid esters. hydrocarbons and combinations thereof.

Since water adsorption is a nearly inevitable process in water-based drilling fluids and the mechanical strength of argillaceous rocks is adversely affected by water adsorption, it is ideal to replace the water with a polar fluid which can compete with water for adsorption but will not severely weaken the mechanical strength of argillaceous rocks when adsorbed. Glycols with a molecular weight of less than about 200, such as ethylene glycol, propylene glycol, butylene glycol, and their dimers and trimers are suitable substitutes for this purpose. Since these glycols are rather simple in chemical structure, they are hereby referred to as "simple " glycols.

The simple glycols have in common that they are slightly to moderately viscous, hygroscopic, colorless and odorless liquids completely miscible with water at all proportions. Unlike their polymeric derivatives, whose solubility in water depends on salinity and temperature, the simple glycols remain miscible with water at all temperatures even in the presence of large amounts of electrolytes. They are also less expensive compared with their polymeric derivatives.

From the standpoint of industrial handling, most of these simple glycols are considered non-hazardous. The greatest hazard to health which may be presented by these glycols is that of direct ingestion in a substantial amount. Based on laboratory test data, propylene, butylene, and tetraethylene glycols are the least toxic, followed by diethylene, triethylene, and dipropylene glycols. Ethylene glycol and tripropylene glycol are considered to be the most toxic. The molecular weights and single-dose oral $LD_{50}$ values of some simple glycols that can be found in the literature are listed below:

|  | $LD_{50}$* | Mole Wt. |
| --- | --- | --- |
| Tripropylene Glycol | ~3 gm/KG | 192.26 |
| Ethylene Glycol | 6–12 gm/KG | 62.07 |
| Dipropylene Glycol | ~15 gm/KG | 134.18 |
| Diethylene Glycol | 16–21 gm/KG | 106.12 |
| Triethylene Glycol | 16–22 gm/KG | 150.17 |
| Propylene Glycol | 21–34 gm/KG | 76.10 |
| Butylene Glycol | 23–30 gm/KG | 90.12 |
| Tetraetylene Glycol | ~31 gm/KG | 194.23 |

*From Clayton, G. D. and Clayton, F. E., Patty's Industrial Hygiene and Toxicology, John Wiley and Sons, 1978.

The simple glycols are useful for lowering water activity and freezing point of an aqueous solution. At moderate concentrations, they can lower the water activity to a level equal to or less than that of most gumbo shales commonly encountered in offshore drilling. This lowering of water activity aids in preventing water adsorption through osmotic effects. The lowering of the freezing point can be utilized to prevent the formation of gas hydrates in deep water drilling while eliminating the use of large amounts of salts. This is discussed, for instance, in U.S. Pat. No. 5,076,373 (Hale et al.).

In one preferred embodiment the glycol-based drilling fluid system of this invention comprises a water-miscible glycol with a molecular weight of less than about 200, such as ethylene glycol, diethylene glycol, triethylene glycol, propylene glycol, butylene glycol and mixtures thereof, present at a concentration of at least 70% by volume, preferably present in a range from 70% to 100% by volume, most preferably 80% to 100% by volume, and even more preferably 85% to 100% by volume of the aqueous phase of the drilling fluid. Incorporated in the aqueous phase of the drilling fluid is an inorganic salt selected from the group consisting of sodium chloride, potassium chloride, calcium chloride, magnesium chloride, sodium bromide, calcium bromide, and mixtures thereof, or an organic salt such as potassium acetate or potassium formate, or choline chloride, in a range from 50,000 mg/liter of water up to saturation, preferably 5% to 20% by weight of the water in the drilling fluid.

The purpose of the salt is to reduce the effect on hydratable clays and shales of water incorporated into the drilling fluid. Some water will enter from subsurface formations during drilling, and some water may be added to deliberately reduce viscosity or cost, for instance.

The high performance inhibitive drilling fluid of this invention further contains drilling fluid additives which impart anti-sticking properties to drilled cuttings and wellbore drilled formations. The additives incorporated in the drilling fluid of this invention are selected from the group consisting of hydrocarbons such as polyalphaolefins, carboxylic acid esters such as dialkyl phthalates, fatty acid esters and vegetable oils, silicone fluids, such as polydimliethylsiloxanes, silicone-based surfactants such as ethoxylated and propoxylated siloxanes, glycol ethers and the like. The anti-sticking additives present in the drilling fluids of this invention are greater than 0.5% by weight, preferably present in the range from 0.5% to 30% by weight of the drilling fluid and more preferably in the range from 0.5% to 20% by weight.

A filtration control agent man be added to control the fluid loss of the drilling fluid. Suitable filtration control agents are well known in the art and may include but are not limited to polyanionic cellulose, polyacrylatem, polysaccharide, lignite, lignosulfonate, and mixtures thereof. However, for this invention it is preferred that the filtration control agent he soluble in the glycol component.

A viscosifier, such as biopolymers, clays and mixtures thereof, also may be added to increase viscosity and suspend solids and weighting materials.

The density of the drilling fluids can be adjusted by using barite, hematite, calcium carbonate, and mixtures thereof.

To minimize solubilization problems of polymer additives that may be encountered at high concentrations of glycol, the filtration control agent and viscosifier should be pre-solubilized in water before the addition of glycol, or preferably be glycol-soluble.

Although this invention has been described with respect to the presently preferred embodiments, it will be appreciated by those skilled in the art that many changes can be made to the drilling fluids without departing from its spirit or essential characteristics. Accordingly, all changes or modifications that come within the meaning and range of equivalency of the claims are to be embraced within their scope.

EXAMPLES

To illustrate the preferred embodiments of the glycol-based drilling fluid of this invention the following, examples appended hereto are provided. These examples are not intended to be limiting on the scope of the invention but are provided to illustrate various embodiments of the invention. The following references, to the extent that they provide exemplary procedural or other details supplementary to those set forth herein, are specifically incorporated herein by reference. In the fluid formulations of these examples, the units of weight are grams unless otherwise specified.

To evaluate the inhibitive effects of the drilling fluid of this invention, the following tests were conducted as outlined in the priority documents, which have been incorporated herein by reference.

The following abbreviations are sometimes used in describing the results of drilling fluid experimentations. The standard drilling fluid test procedures are described in API bulletin RP 13B-2, 1990.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 feet square (lb/100 ft$^2$).

"AV" is apparent viscosity which is another variable used in the calculation of viscosity characteristic of drilling fluid, measured in centipoise (cp) units.

"Gels" are a measure of the suspending characteristics, or the thixotripic properties of a drilling fluid, measured in pounds per 100 square feet (lb/100 ft$^2$).

"API Fluid Loss" is the term used for API filtrate loss in milliliters (ml).

Following are the examples to further illustrate the superior performance of the drilling fluids of this invention. Proprietary chemicals are in some of the examples identified by trade names. Specifically, Aristech PX 139 is a di-isononylphthallate; Hostadrill 2825 is a glycol-soluble terpolymer supplied by Hoeschst; Polydrill is a glycol-dispersible compound supplied by SKW.

Example 1

Bentonite Swelling

The following test was conducted to show the inhibition of bentonite clay at various concentrations of diethylene glycol (DEG) in water.

Fifty grams of untreated bentonite gel was added to a 350 ml of test fluid. The bentonite slurry was stirred for 30 minutes on a Hamilton Beach mixer. The pH of the slurry was adjusted to 10 with 50% sodium hydroxide solution. After mixing the slurry in a Waring Blender for 10 minutes the rheological properties were measured at 120° F. on the Fann Model 35 A Viscometer. Table 1 shows the rheological properties.

TABLE ONE

Bentonite Swelling Test Date

| Test Sample | AV | Gel 10 sec | Gel 10 min | PV | YP |
|---|---|---|---|---|---|
| 50/50 Diethylene Glycol/Water | 77 | 99 | 118 | 38 | 77 |
| 60/40 Diethylene Glycol/Water | 19 | 21 | 38 | 13 | 12 |
| 70/30 Diethylene Glycol/Water | 16 | 7 | 12 | 13 | 6 |
| 80/20 Diethylene Glycol/Water | 15 | 5 | 6 | 13 | 4 |
| 90/10 Diethylene Glycol/Water | 17 | 3 | 3 | 15 | 3 |

The above data shows that superior inhibition of bentonite clay swelling is obtained at 70% or higher concentrations of diethylene glycol in water.

Example 2
Gumbo Shale—Sticking Test

The following test was conducted to show the antisticking properties of various concentrations of diethylene glycol in water. The gumbo was obtained from a well drilled in the Gulf of Mexico.

Three hundred and fifty milliliters of diethylene glycol test samples were hot rolled at 150° F. in a glass jar containing a steel pipe. After 30 minutes, 10 pieces of dried gumbo-shale were placed in the jar. The following table shows the percentage of gumbo shale sticking to the pipe and/or glass jar, with continued rolling at 150° F., observed at indicated lapsed times.

TABLE TWO

Sticking Test
Percentage of Cutting Sticking

|  | One Min | Two Mins. | Five Mins. | Ten Mins. | Fifteen Mins. | Twenty Mins. | Thirty Mins. |
|---|---|---|---|---|---|---|---|
| 50/50 Diethylene Glycol/Water | 100 | 100 | 100 | 100 | 100 | 100 | 100 |
| 60/40 Diethylene Glycol/Water | 60 | 70 | 100 | 100 | 100 | 100 | 100 |
| 70/30 Diethylene Glycol/Water | 0 | 0 | 0 | 0 | 20 | 50 | 40 |
| 80/20 Diethylene Glycol/Water | 0 | 0 | 0 | 0 | 0 | 0 | 0 |
| 90/10 Diethylene Glycol/Water | 0 | 0 | 0 | 0 | 0 | 0 | 0 |

The above results indicate that superior non-sticking properties were obtained at concentrations above 70% diethylene glycol in water.

Example 3

The following sticking test was conducted to show the effect of an antisticking agent on gumbo-shale in diethylene glycol test fluids.

This test was conducted using the test method described in example 2, except each test sample contained 10% glycerol monooleate (GMO) as the antisticking agent. The following results were obtained.

TABLE THREE

Sticking Test - Glycol/Water Plus 10% GMO
Percentage of Cuttings Sticking

|  | One Min | Two Mins. | Five Mins. | Ten Mins. | Fifteen Mins. | Twenty Mins. | Thirty Mins. |
|---|---|---|---|---|---|---|---|
| 50/50 Diethylene Glycol/Water - 10% GMO | 0 | 0 | 30 | 10 | 20 | 40 | 100 |
| 60/40 Diethylene Glycol/Water - 10% GMO | 0 | 0 | 0 | 10 | 10 | 20 | 30 |
| 70/30 Diethylene Glycol/Water - 10% GMO | 0 | 0 | 0 | 0 | 0 | 0 | 0 |
| 80/20 Diethylene Glycol/Water - 10% GMO | 0 | 0 | 0 | 0 | 0 | 0 | 0 |
| 90/10 Diethylene Glycol/Water - 10% GMO | 0 | 0 | 0 | 0 | 0 | 0 | 0 |

The above data shows the superior antisticking properties of the test samples containing above 70% diethylene glycol in water. The glycerol monooleate improved the antisticking properties of the diethylene glycol fluids of this invention.

Example 4

The following tests were conducted to show the effect of salt in combination with an antisticking agent on antisticking properties of a more difficult gumbo shale from a well in Ewing Banks Block 873 of the Gulf of Mexico as shown by two diethylene glycol fluids.

The following two formulations were prepared for this test.

Formulation A: 60/40 (DEG/H$_2$O)

| DEG | 211.3 |
|---|---|
| Water | 126.0 |
| KCl | 10.0 |
| Glycerol Monooleate | 35.0 |

Formulation B: 80/20 (DEG/H$_2$O)

| DEG | 281.7 |
|---|---|
| Water | 55.6 |
| NaCl | 13.7 |
| Aristech PX 139 | 35.0 |

The pH of both of the formulations was adjusted to 10 using 50% KOH.

|  | One Min | Two Mins. | Five Mins. | 10 Mins. | 15 Mins. | 20 Mins. | 25 Mins. | 30 Mins. |
|---|---|---|---|---|---|---|---|---|
| Formulation-A | 0 | 10 | 20 | 40 | 20 | 70 | 80 | 100 |
| Formulation-B | 0 | 0 | 0 | 0 | 0 | 0 | 0 | 0 |

The table shows the percentage of cuttings sticking per the test method of Example 2 at the elapsed times.

The above results show that salt and antisticking agent gave superior results in the test fluid containing 80/20 diethylene glycol/water.

Example 5
Bentonite Dispersion Test

The following test shows the superior performance of diethylene glycol in concentrations greater than 70% in the bentonite dispersion test.

The following two test fluids were prepared for this test.

| Test Fluid -1 | 60/40 (DEG/Water) |
|---|---|
| DEG | 226.0 |
| Water | 135.2 |
| KCl | 10.0 |
| Glycerol Monooleate | 10.5 |

| Test Fluid - 2 | 80/20 (DEG/Water) |
|---|---|
| DEG | 281.7 |
| Water | 55.6 |
| NaCl | 13.7 |
| Glycerol Monooleate | 35.0 |

The pH of both of the test fluids was adjusted to 10 using 50% KOH.

The above test fluids were hot rolled at 150° F. for 30 minutes. Ten grams of dried bentonite pellets were added to the test fluids and hot rolled for an additional 1 hour at 150° F. After the heat aging period the fluids were screened through a 20 mesh screen. The solids retained on the screen were dried to a constant weight at 400° F. The results are reported as percent pellets recovered.

| Fluids | Percent Pellets Recovered |
|---|---|
| Test Fluid - 1 | 81.7 |
| Test Fluid - 2 | 100 |

The bentonite pellets in test fluid-1 were soft, sticky and cleaved into many small pieces. The bentonite pellets in test fluid-2 were hard and non-sticky.

The above results show the superior performance of the diethylene glycol fluids of this invention.

Example 6

The following drilling fluids were prepared using high concentrations of diethylene glycol in water. The materials were stirred together in the order listed for a total of 45 minutes at 2500 rpm on a Hamilton Beach mixer.

| Drilling Fluid 1 | |
|---|---|
| Diethylene Glycol | 269 |
| Water | 27 |
| Sepiolite | 8 |
| Polydrill | 5 |
| Barite | 192 |
| Glycerol Monooleate | 27 |
| Sodium Chloride | 5.4 |
| Drilling Fluid 2 | |
| Diethylene Glycol | 270 |
| Water | 27 |
| Sepiolite | 12 |
| Hostadrill 2825 | 1.5 |
| Barite | 192 |
| Glycerol Monooleate | 27 |
| Sodium Chloride | 5.4 |
| Drilling Fluid 3 | |
| Diethylene Glycol | 297.3 |
| Water | 7.6 |
| Polydrill | 4.0 |
| Sepiolite | 12.5 |
| Barite | 282.0 |
| Drilling Fluid 4 | |
| Diethylene Glycol | 295.0 |
| Water | 29.4 |
| Sepiolite | 12.0 |
| Hostadrill 2825 | 1.5 |
| Barite | 147.8 |
| Aristech PX 139 | 13.0 |
| Sodium Chloride | 5.4 |

After hot rolling at 150° F. for 16 hours, the fluids were mixed 10 minutes on a Waring blender. Then the following rheological properties were measured at 120° F.

TABLE FOUR

Drilling Fluid Rheologies

| | Drilling Fluid 1 | Drilling Fluid 2 | Drilling Fluid 3 | Drilling Fluid 4 |
|---|---|---|---|---|
| PV | 41 | 52 | 43 | 30 |
| YP | 16 | 15 | 15 | 7 |
| 10 sec Gel | 7 | 6 | 3 | 3 |
| 10 min Gel | 22 | 22 | 11 | 6 |
| API Fluid Loss | 8.4 | 7.0 | 2.8 | — |

Example 7

The following table shows the viscosity properties of the water soluble glycols of this invention. Readings were taken on a Fann 35A viscometer at 600 and 300 rpm both at room temperature and 120° F.

| | Room Temperature | | 120° F | |
|---|---|---|---|---|
| Product | 600 rpm | 300 rpm | 600 rpm | 300 rpm |
| Diethylene Glycol | 61 | 32 | 23 | 12 |
| Triethylene Glycol | 83 | 42 | 31 | 16 |
| Propylene Glycol | 92 | 47 | 28 | 15 |
| Dipropylene Glycol | 163 | 82 | 41 | 21 |
| Tripropylene Glycol | 116 | 59 | 34 | 18 |
| 2-Methyl Propyl 1,3-Diol | 300+ | 216 | 80 | 42 |
| Glycerine | 300+ | 300+ | 262 | 135 |
| Glycerine Bottoms HF-100N | 300+ | 300+ | 220 | 111 |
| Polyol-80 (Dow Chemical) | 300+ | 300+ | 300+ | 198 |

The above data shows that glycerol type of compounds have very high viscosities as compared to glycols.

What is claimed is:

1. An improved high performance inhibitive drilling fluid comprising:
    a water miscible glycol at a concentration of at least 70% by volume of the continuous phase of said drilling fluid, wherein said glycol has a molecular weight less than 200,
    an anti-sticking drilling fluid additive present at a concentration of at least 0.5% by weight of the drilling fluid, wherein the anti-sticking drilling fluid additive is selected from the group consisting of silicone-fluids, silicone based surfactants, hydrocarbons, carboxylic acid esters and combinations thereof, and a weighting agent.

2. The improved high performance inhibitive drilling fluid of claim 1 further comprising:

water;

a dissolved salt at a concentration greater than 50,000 mg/liter of water in said drilling fluid, a particulate phase which consists of solids carried or suspended in said drilling fluid and a weighting agent.

3. An improved high performance inhibitive water-miscible-glycol base drilling fluid comprising:

a glycol at a concentration of at least 70% by volume of the continuous phase of said drilling fluid said glycol having a molecular weight of less than 200, and an anti-sticking drilling fluid additive present at a concentration of at least 0.5% by weight of the drilling fluid, wherein the anti-sticking drilling fluid additive is selected from the group consisting of silicone-fluids, silicone based surfactants, hydrocarbons, carboxylic acid esters and combinations thereof, and a particulate phase which consists of solids carried or suspended in the continuous phase, wherein at least a portion of said particulate phase is a weighting agent.

4. The improved high performance inhibitive water-miscible-glycol base drilling of claim 3, further comprising water, said water not in excess of 30% by volume of the drilling fluid and a dissolved salt at a concentration greater than 50,000 mg/liter of water in said drilling fluid.

5. The drilling fluid of claim 4 wherein the glycol is selected from the group consisting of ethylene glycol, diethylene glycol, triethylene glycol, propylene glycol, dipropylene glycol, tripropylene glycol, butylene glycol and mixtures thereof.

6. The drilling fluid of claim 5 wherein said salt is selected from the group consisting of sodium chloride, potassium chloride, calcium chloride, magnesium chloride, sodium bromide, calcium bromide, potassium acetate, potassium formate and choline chloride.

7. An improved high performance inhibitive water-miscible-glycol base drilling fluid comprising:

a predominantly glycol continuous phase, said glycol having a molecular weight less than 200 and an anti-sticking drilling fluid additive present at a concentration of at least 0.5% by weight of the drilling fluid, and a weight agent, wherein the anti-sticking drilling fluid additive is selected from the group consisting of silicone-fluids, silicone based surfactants, hydrocarbons, carboxylic acid esters and combinations thereof.

8. A water-miscible-glycol base drilling fluid comprising:

a glycol present at a concentration of at least 70% by volume of the continuous phase of said drilling fluid, wherein said glycol has a molecular weight less than 200;

an anti-sticking drilling fluid additive present at a concentration of at least 0.5% by weight of the drilling fluid;

water, a dissolved salt at a concentration greater than 50,000 mg/liter of water in said drilling fluid, and a weighting agent, wherein the anti-sticking agent is selected from the group consisting of silicone fluids, silicone-based surfactants, hydrocarbons, glycol ethers, carboxylic acid esters and combinations thereof.

9. A water-miscible-glycolbase drilling fluid comprising:

a glycol with a molecular weight of less than about 200, said glycol being present at a concentration of at least 70% by volume of the continuous phase, wherein the glycol is selected from the group consisting of ethylene glycol, diethylene glycol, triethylene glycol, propylene glycol, dipropylene glycol, tripropylene glycol, butylene glycol and mixtures thereof;

an anti-sticking drilling fluid additive being present at a concentration of at least 0.5% by weight, wherein the anti-sticking agent is selected from the group consisting of silicone fluids, silicone-based surfactants, hydrocarbons, carboxylic acid esters and combinations thereof;

a salt being present at in a concentration greater than 50,000 mg/liter of water in said drilling fluid;

a filtration control agent for lowering fluid loss of said drilling fluid; and a viscosifier for suspension of solids or weighting materials in said drilling fluid water; and a particulate phase which consists of solids carried or suspended in the continuous phase, wherein at least a portion of the particulate phase is a weighting agent.

10. The drilling of claim 9 wherein the glycol is diethylene glycol, the antisticking agent is glycerol monooleate.

* * * * *

UNITED STATES PATENT AND TRADEMARK OFFICE
CERTIFICATE OF CORRECTION

PATENT NO. : 6,291,405 B1  Page 1 of 1
DATED : September 18, 2001
INVENTOR(S) : LiJien Lee, Arvind D. Patel, and Emanuel Stamatakis It is certified that error appears in the above-identified patent and that said Letters Patent is hereby corrected as shown below:

Column 2,
Line 23, delete "4,719,02" and insert -- 4,719,021 --

Column 7,
Table 30, under Five Mins. delete "30" and insert -- 0 --

Column 12,
Line 26, after the word "drilling" add -- fluid --.

Signed and Sealed this

Twelfth Day of March, 2002

Attest:

JAMES E. ROGAN
*Attesting Officer*  *Director of the United States Patent and Trademark Office*